Patented June 2, 1936

2,042,630

UNITED STATES PATENT OFFICE 2,042,630

MANUFACTURE OF 6-BROMO-2,4-DINITRANILINE

Gustav Reddelien, Leipzig, and Heinrich Ohlendorf, Dessau in Anhalt, Germany, assignors to General Aniline Works, Inc., New York, N. Y., a corporation of Delaware No Drawing. Application June 27, 1933, Serial No. 677,954. In Germany July 2, 1932

3 Claims. (Cl. 260—130.5)

This invention relates to a manufacture of 6-bromo-2,4-dinitraniline in one operation with a good yield on a commercial scale and of very high purity, by introducing bromine at a moderately raised temperature, preferably about 40 to about 60° C., into an aqueous suspension of 2,4-dinitraniline kept in whirling motion, so that there occurs a distribution as rapid as possible of the constituents of the mixture in the containing vessel. This distribution is attained, for example, by means of a nozzle within the mixture and/or a stirring device or the like.

By observing these conditions the whole of the dinitraniline gradually becomes the corresponding halogen compound and secondary reactions, such as the formation of halogen-dinitrophenol or more highly halogenated bodies are substantially avoided. When the reaction is complete the very pure bromo-dinitraniline is filtered from the hydrogen halide solution. The 6-bromo-2,4-dinitraniline obtained melts at 151 to 152° C. and is therefore more pure than that which was isolated by Körner after numerous purifications, which melted at 144° C.

Körner (Gaz. chim. ital. 1874, 393) in the course of his scientific work has obtained 6-bromo-2,4-dinitraniline by passing a mixture of bromine vapor and air through an aqueous suspension of dinitraniline. The product of this reaction must first be subjected to a detailed purification and there is finally obtained 6-bromo-2,4-dinitraniline which, as indicated by the melting point, is still impure. This scientific operation does not lead to a commercial process.

For hastening the reaction, there may be added one of the usual catalysts of halogenation, such as iodine or ferric chloride.

The following examples illustrate the invention:

Example 1.—In a stirring vessel 183 parts of 2,4-dinitraniline are intimately stirred into 4000 parts of water. While maintaining a temperature of 40 to 50° C. and rapidly stirring, there are introduced gradually through a nozzle opening under the surface of the water 170 parts of bromine in the liquid form. After about 30 to 40 hours the absorption is complete, whereupon, while still stirring, the temperature is maintained for about 15 hours at about 55° C.; after cooling to about 25° C. the well formed yellow needles of 6-bromo-2,4-dinitraniline are separated by filtration. The yield amounts to 260 parts, which is 99 per cent. of the theoretical yield. The melting point is 151 to 152° C.

The compound produced by this invention is a valuable intermediate product for making dyes.

What we claim is:—

1. In the manufacture of 6-bromo-2,4-dinitraniline by treating 2,4-dinitraniline with bromine, the steps which comprise suspending the parent aniline compound in water and introducing liquid bromine into the suspension kept in an intensive whirling motion.

2. In the manufacture of 6-bromo-2,4-dinitraniline by treating 2,4-dinitraniline with bromine, the steps which comprise suspending the parent aniline compound in water and introducing at about 40 to about 60° C. liquid bromine into the suspension kept in an intensive whirling motion.

3. In the manufacture of 6-bromo-2,4-dinitraniline by treating 2,4-dinitraniline with bromine, the steps which comprise suspending 183 parts of 2,4-dinitraniline in water and introducing, while rapidly stirring, 170 parts of liquid bromine at about 40 to about 50° C. in a finely subdivided form under the surface of the water in the course of about 30 to 40 hours.

GUSTAV REDDELIEN.
HEINRICH OHLENDORF.